United States Patent
Hung et al.

(10) Patent No.: US 7,915,322 B2
(45) Date of Patent: Mar. 29, 2011

(54) POLYMERIZABLE WATER-SOLUBLE OR ALCOHOL-SOLUBLE ULTRAVIOLET ABSORBER

(75) Inventors: Chiu-Ming Hung, Taoyuan Hsien (TW); Wei-Ju Chen, Taoyuan Hsien (TW); Cheng-Han Chung, Taoyuan Hsien (TW); Chih-Kang Chang, Taoyuan Hsien (TW); Hsiang-Lin Jiang, Taoyuan Hsien (TW); You-Chin Mou, Taoyuan Hsien (TW); Yen-Cheng Li, Taoyuan Hsien (TW); Chi-Hsiang Yao, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 464 days.

(21) Appl. No.: 12/149,307

(22) Filed: Apr. 30, 2008

(65) Prior Publication Data

US 2009/0275717 A1 Nov. 5, 2009

(51) Int. Cl.
    *G02B 1/04* (2006.01)
(52) U.S. Cl. ........ 523/105; 523/106; 523/107; 523/108; 523/113; 526/264
(58) Field of Classification Search .......... 523/105–108, 523/113; 526/264
See application file for complete search history.

(56) References Cited

U.S. PATENT DOCUMENTS

| 4,304,895 | A | 12/1981 | Loshaek |
| 4,528,311 | A | 7/1985 | Beard et al. |
| 6,036,891 | A | 3/2000 | Liao et al. |

FOREIGN PATENT DOCUMENTS

JP 11049824 2/1999

*Primary Examiner* — Edward J Cain
(74) *Attorney, Agent, or Firm* — Bacon & Thomas, PLLC

(57) ABSTRACT

The present invention relates to a polymerizable water-soluble or alcohol-soluble ultraviolet absorber, which is represented by the following formula (I):

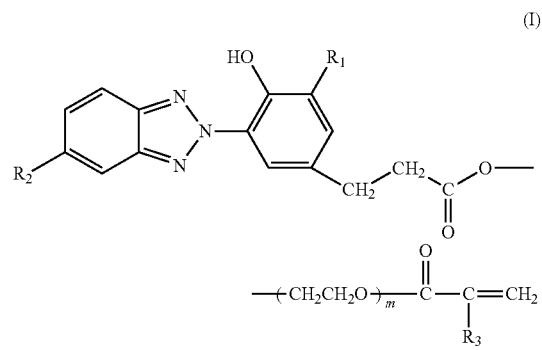

wherein $R_1$ is H or $C_{1\sim5}$ alkyl; $R_2$ is H, Cl, Br or I; $R_3$ is H or methyl; and m each is an integer in the range from 3 to 12. The above-mentioned compounds are suitable for copolymerizing with one or more monomers to form copolymers so that the UV-light resistance of the copolymer can be efficiently promoted. For example, the polymer made by copolymerizing the above-mentioned compound with acrylate monomers can be applied to the production of optical medical materials, especially contact lenses or intraocular lenses.

11 Claims, 1 Drawing Sheet

POLYMERIZABLE WATER-SOLUBLE OR ALCOHOL-SOLUBLE ULTRAVIOLET ABSORBER

BACKGROUND OF THE INVENTION

1. Field of the Invention

The present invention relates to a novel polymerizable ultraviolet absorber, which is water-soluble or alcohol-soluble, and also discloses a method for preparing the same and application thereof in the fields of medical optics.

2. Description of Related Art

Ultraviolet rays in sunlight radiating on the Earth mostly have radiant energy of the wavelength between 290 and 400 nm. In general, ultraviolet rays can be absorbed by the thermosphere at about 100 km above the Earth's atmosphere if their wavelength is less than 175 nm, and can be absorbed by the ozonosphere at about 15 km above sea level if their wavelength is in the range of from 175 to 290 nm. As well-known, exposure under ultraviolet rays will cause skin and cornea injuries and result in visual impairment, and also is a main cause of cataracts. Hence, it is important to learn how to sufficiently provide visional protection from ultraviolet rays, how to decrease morbidity of cataract, and how to protect UV-susceptible people such as patients treated with ophthalmic surgery or light-sensitive patients.

Generally, ultraviolet absorbers can be added in the composition of contact lenses or common spectacles to absorb ultraviolet rays of from 290 to 400 nm. Hence, harmful radiation effects of ultraviolet rays can be lowered so as to protect the visional system and to reduce the morbidity of cataract. Up to the present, there has been developed various ultraviolet absorbers, and those are efficiently applied in the composition of contact lenses or common spectacles. However, in order to prevent loss of ultraviolet absorbers from lenses in any condition, the material of the lenses preferably is grafted or copolymerized with polymerizable ultraviolet absorbers. For example, U.S. Pat. No. 4,304,895 discloses reactive ultraviolet absorbers for contact lenses, which are represented by the following formulas.

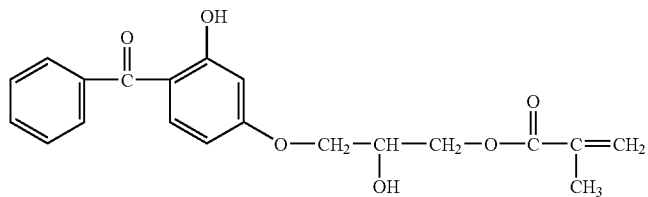

Although the abovementioned ultraviolet absorbers of diphenylmethanone having reactive groups can participate in polymerization, this kind of ultraviolet absorbers has inadequate stability. When the abovementioned absorbers are applied in lenses, the ultraviolet resistance thereof decreases gradually during storage of the lenses or due to the lifespan thereof. Meanwhile, the abovementioned ultraviolet absorbers are insoluble in hydrophilic polymerizable comonomers and copolymers of acrylate owing to their hydrophobicity. Even though they are slightly soluble in hydrophilic polymerizable comonomers and copolymers, they trend towards aggregation from microphase separation when copolymers undergo hydration. The aggregation makes lenses appear misty and hence reduces transparency of lenses.

Furthermore, U.S. Pat. No. 4,528,311 discloses a reactive ultraviolet absorber represented by the following formula.

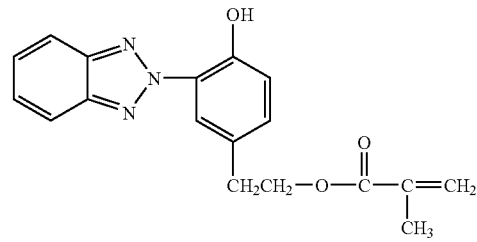

Although the foregoing ultraviolet absorber of benzotriazole is polymerizable and has preferred stability, this compound is still hydrophobic. Such hydrophobicity will result in occurrence of microphase separation and mist.

Furthermore, U.S. Pat. No. 6,036,891 discloses an ultraviolet absorber which is made by reacting a new compound, 2-(2'-hydroxy-5'-hydroxyethoxyethyl-phenyl-2H-benzotriazole, with methacryloyl chloride to form a monoester compound. This compound is represented by the following formula.

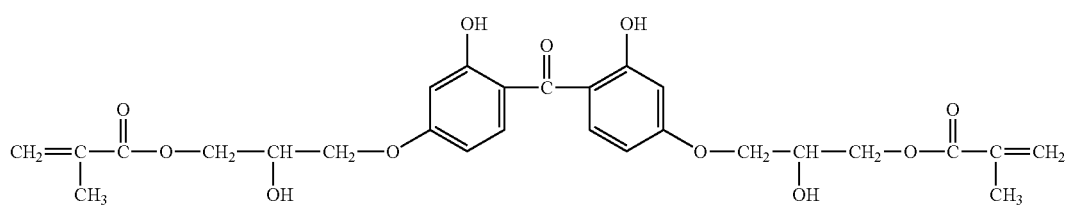

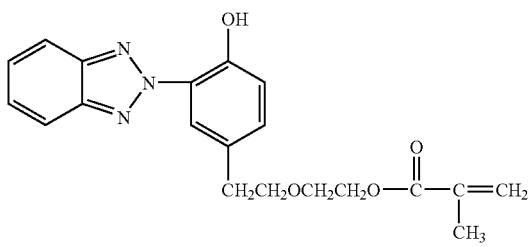

However, it is unfortunate that the specification of the above-mentioned patent discloses neither how to obtain 2-(2'-hydroxy-5'-hydroxyethoxyethyl-phenyl-2H-benzotriazole nor how to synthesize it. Moreover, although this reactive ultraviolet absorber is more hydrophilic than those synthesized in the past, its water solubility is still poor. Besides, an ultraviolet absorber, disclosed in Japan patent no. 3,655,061, represented by the following formula also has the problem of poor solubility.

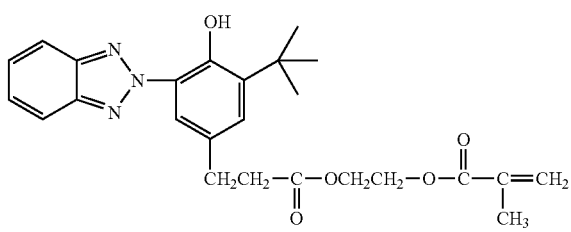

Hydrophilicity is a property different from water or alcohol solubility. Materials for manufacturing contact lenses should have good hydrophilicity so that the contact lenses can move in accordance with eyeballs to achieve rectification of eyesight. Besides, sufficient hydrophilicity can increase comfort of contact lenses. Because hydrophilicity is important to contact lenses or intraocular lenses, materials for manufacturing those lenses are required to be hydrophilic. In addition, a little amount of nonreactive components should be removed by washing to ensure no toxicity exists after synthetic reactions. Generally, residual nonreactive monomers need to be removed by use of a great deal of solvents in a manufacturing process. However, this not only requires a lot of time and work, it also increases costs. If components used in synthetic reactions are water-soluble or alcohol-soluble, neither mist is generated after polymerization nor volatile organic compound is discharged while residual nonreactive monomers are removed by washing. Hence, problems to the environment do not occur, and production costs can be reduced.

SUMMARY OF THE INVENTION

A novel polymerizable ultraviolet absorber of the present invention, which is represented by the following formula (I), belongs to diester and has good water-solubility or alcohol-solubility. It is capable of reacting with or polymerized with hydrophilic or water-soluble monomers so as to stably produce transparent copolymers.

Hence, the present invention provides a monomer of a polymerizable water-soluble or alcohol-soluble ultraviolet absorber, which is represented by the following formula (I):

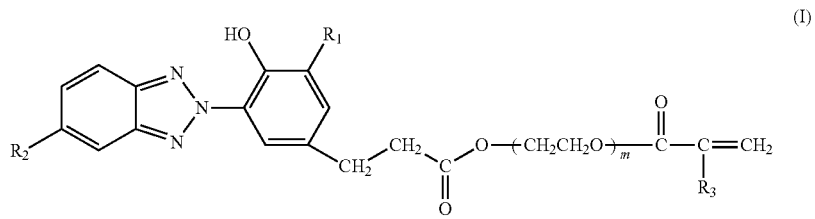

wherein $R_1$ is H or $C_{1-5}$ alkyl; $R_2$ is H, Cl, Br or I; $R_3$ is H or methyl; and m is an integer in the range from 3 to 12.

The present invention also provides a copolymer polymerized by reacting the compound of the formula (I) with hydrophilic or water-soluble monomers. This copolymer, which has optical properties and is a transparent polymer, can be used as manufacturing materials for contact lenses, intraocular lenses, etc. in the field of optical medicine.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
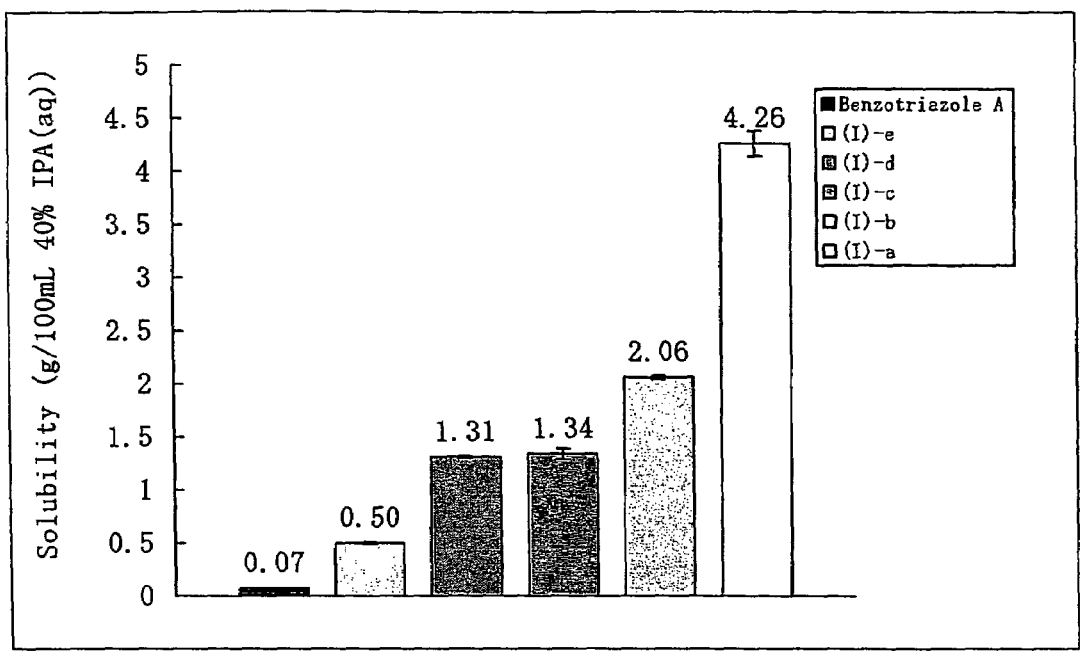
FIG. 1 is a bar chart for comparing solubility of compounds (I)-a, (I)-b, (I)-c, (I)-d, and (I)-e with that of commercial Benzotriazole A in Example 6 of the present invention.

The novel polymerizable water-soluble ultraviolet absorber is represented by the following formula (I):

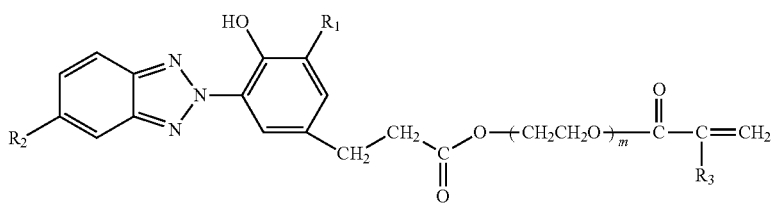

(I)

wherein $R_1$ is H or $C_{1-5}$ alkyl; $R_2$ is H, Cl, Br or I; $R_3$ is H or methyl; and m is an integer in the range from 3 to 12.

A method for manufacturing the compound of the above-mentioned formula (I) is illustrated as follows. A compound represented by the following formula (II) is reacted with polyethylene glycol (PEG) represented by the following formula (III) to obtain a compound represented by the following formula (IV), and then the compound of the formula (IV) is reacted with an acrylate represented by the following formula (V) to obtain a compound represented by the following formula (I),

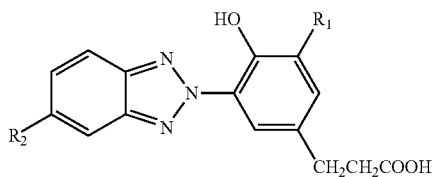

(II)

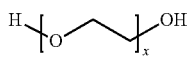

(III)

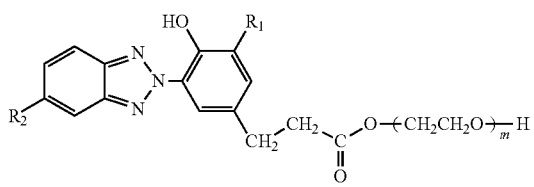

(IV)

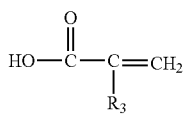

(V)

wherein $R_1$, $R_2$, $R_3$ and m are defined as above-mentioned, and x is an integer in the range from 3 to 12.

Also, another method for manufacturing the compound of the above-mentioned formula (I) is illustrated as follows. A compound represented by the following formula (II) is reacted with a compound represented by the following formula (VI) to obtain a compound represented by the following formula (I),

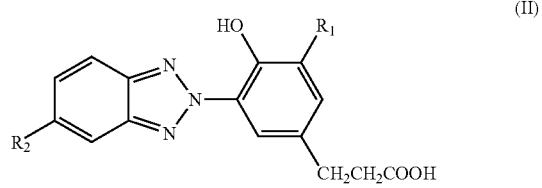

(II)

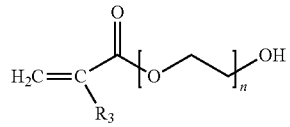

(VI)

wherein $R_1$, $R_2$, and $R_3$ are defined as above-mentioned and n is an integer in the range from 3 to 12.

The water-soluble compound of the above-mentioned formula (I) has excellent alcohol-solubility at the same time, and is suitable for application to hydrophilic contact lenses or intraocular lenses.

Preferably, the compound of the formula (I) in the present invention is, for example, a compound (I)-a ($R_1$=H, $R_2$=H, $R_3$=H, and m=6-8), a compound (1)-b ($R_1$=H, $R_2$=H, $R_3$=CH$_3$, and m=9-11), a compound (I)-c ($R_1$=H, $R_2$=H, $R_3$=CH$_3$, and m=5-7), a compound (I)-d ($R_1$=C(CH$_3$)$_3$, $R_2$=H, $R_3$=CH$_3$, and m=5-7) or a compound (I)-e ($R_1$=C(CH$_3$)$_3$, $R_2$=H, $R_3$=CH$_3$, and m=3-5).

The present invention also provides a copolymer which is polymerized by reacting the compound of the formula (I) with hydrophilic or water-soluble monomers. Such copolymer is a transparent polymer having good hydrophilicity and optical properties, and is suitable for manufacture of contact lenses or intraocular lenses. Besides, the step of extracting the nonreactive monomers can be simplified in a subsequent process. For example, suitable hydrophilic materials are so-called hydrogel or silicone hydrogel.

The compound of the formula (I) in the present invention can be polymerized with hydrophilic or water-soluble monomers in any well-known method where conditions and steps are known by one skilled in the art. Generally, other additives may be selectively added in a reaction of the steps, and appropriate additives include cross-linking agents, surfactants, diluents, stabilizers, photo-initiators, dyes and so forth, but are not limited thereto.

In order to further illustrate, examples are exemplified for specific explanation.

Hereinafter, the present invention will be further explained. However, it is to be understood that the examples below are only for illustration, but not to limit the scope of the present invention. Any modification or variation, which can be easily achieved by one skilled in the art, is included in the scope of the present invention. Without specific explanations, the unit of the parts and percentages used in the examples is calculated by weight and the temperature is represented by Celsius degrees (° C.).

EXAMPLES

The structural formula of the compounds described in the examples is shown as the following.

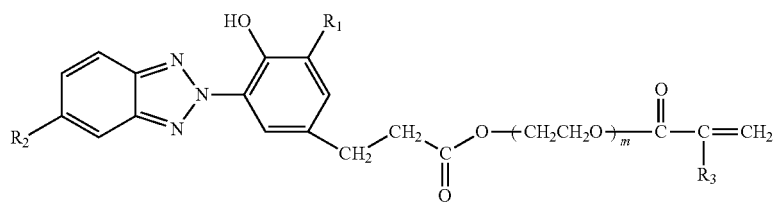

The compound (I)-a: $R_1$=H, $R_2$=H, $R_3$=H, and m=6-8.
The compound (I)-b: $R_1$=H, $R_2$=H, $R_3$=CH$_3$, and m=9-11.
The compound (I)-c: $R_1$=H, $R_2$=H, $R_3$=CH$_3$, and m=5-7.
The compound (I)-d: $R_1$=C(CH$_3$)$_3$, $R_2$=H, $R_3$=CH$_3$, and m=5-7.
The compound (I)-e: $R_1$=C(CH$_3$)$_3$, $R_2$=H, $R_3$=CH$_3$, and m=3-5.

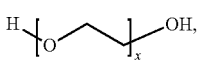

Formula (II)-1: $R_1$=H and $R_2$=H.
Formula (II)-2: $R_1$=C(CH$_3$)$_3$ and $R_2$=H.
PEG375AA:

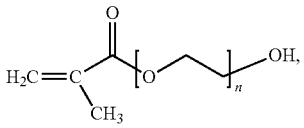

n=6-8, and purchased from Aldrich company.
PEG360MA:

n=5-7, and purchased from Aldrich company.

PEG526MA:

n=9-11, and purchased from Aldrich company.

PEG200:

n=3-5, and purchased from Fluka company.

Example 1

Preparation of the Compound (I)-a

To a 1-L four-necked flask equipped with a thermometer and a distillation device for dehydration, 20 g of the compound of the formula (II)-1, 26.8 g of PEG375AA, 2.7 g of p-toluenesulfonic acid (PTSA) and 100 g of toluene are added. After the mixture in the flask is stirred and heated to 112° C. on a hot-plate stirrer, the distillation device starts to collect water until about 1 ml is reached. Meanwhile, thin-layer chromatography (TLC) is used to ensure the completion of the reaction. After the mixture is cooled to 90° C., 100 ml of 1N NaHCO$_3$ aqueous solution is added slowly to the mixture and stirred for 15 minutes at the same temperature. The mixture is poured into an extraction flask and stood for a while to separate into two layers. The lower aqueous layer is removed into a waste container. To the extraction flask, 100 ml of 1N NaHCO$_3$ aqueous solution are further added, and the mixture is stood for a while to separate into two layers. The lower aqueous layer is discarded. The organic upper layer is collected and condensed to obtain 45 g crude extract (I)-a.

Purification of the Compound (I)-a 300 g (about 15-fold amounts of sample) of column packing gel (Waters corporation, preparative C18 125 Å) and 450 ml of methanol are evenly mixed, and then poured slowly in a column (Pyrex company, 25G3) for packing. After the packing of the column achieves compactness, deionized water the same as the amount of methanol is used to substitute methanol, and then substituted by 2 L of an eluent (methanol:water=1:1). About 20 g of the crude extract (I)-a is slowly poured into the column and eluted by about 2 L of the eluent (methanol:water=1:1), and every 200 mL of eluate are collected as one fraction. Then, the crude extract (I)-a is eluted by another eluent (methanol:water=7:3) and eluate is collected for HPLC analysis. Once the collected eluate amounts to about 4 L, the pure target compound appears, and is continuously analyzed by reverse phase TLC (Merck company, RP-18 $F_{254}S$) to check when to stop elution. After HPLC analysis is completed, the target compound is condensed to meet the specification and then obtained a brown-oil product.

Compound (I)-a Spectrum $^1$H NMR (CDCl$_3$):

δ: 11.18 (s, 1H), 8.26 (s, 1H), 7.90 (q, 2H), 7.50 (q, 2H), 7.20 (d, 1H), 7.12 (d, 1H), 6.41 (m, 1H), 6.15 (m, 1H), 5.82 (m, 1H), 4.25 (m, 4H), 3.63 (m, 24H), 2.99 (t, 2H), 2.68 (t, 2H).

Examples 2-4

The compounds (I)-b, (I)-c and (I)-d are prepared in the same manner as the preparation and purification in Example 1 except for respective used materials listed as in the following Table 1.

TABLE 1

|  | Product | Material 1 | Material 2 |
|---|---|---|---|
| Example 2 | Compound (I)-b | (II)-1 | PEG526MA |
| Example 3 | Compound (I)-c | (II)-1 | PEG360MA |
| Example 4 | Compound (I)-d | (II)-2 | PEG360MA |

The spectra of the compounds (I)-b, (I)-c and (I)-d are respectively listed as follows.

Compound (I)-b Spectrum $^1$H NMR (CDCl$_3$):

δ: 11.19 (s, 1H), 8.26 (s, 1H), 7.93 (q, 2H), 7.52 (q, 2H), 7.21 (d, 1H), 7.12 (d, 1H), 6.12 (s, 1H), 5.56 (s, 1H), 4.26 (m, 4H), 3.63 (m, 36H), 3.00 (t, 2H), 2.69 (t, 2H), 1.94 (s, 3H).

Compound (I)-c Spectrum $^1$H NMR (CDCl$_3$):

δ: 11.17 (s, 1H), 8.24 (s, 1H), 7.91 (q, 2H), 7.47 (q, 2H), 7.20 (d, 1H), 7.11 (d, 1H), 6.12 (s, 1H), 5.56 (s, 1H), 4.26 (m, 4H), 3.63 (m, 20H), 3.00 (t, 2H), 2.69 (t, 2H), 1.89 (s, 3H).

Compound (I)-d Spectrum $^1$H NMR (CDCl$_3$):

δ: 11.81 (s, 1H), 8.14 (s, 1H), 7.92 (q, 2H), 7.47 (q, 2H), 7.20 (s, 1H), 6.12 (s, 1H), 5.57 (s, 1H), 4.28 (m, 4H), 3.64 (m, 20H), 3.00 (t, 2H), 2.73 (t, 2H), 1.94 (s, 3H), 1.50 (s, 9H).

Example 5

Preparation of the Compound (I)-e 100 g of the compound of the formula (II)-2, 590 g of PEG200, 5.6 g of PTSA and 500 ml of toluene are added in a 1-L four-necked flask equipped with a thermometer and a distillation device for dehydration. After the mixture in the flask is stirred and heated to 112° C. on a hot-plate stirrer, the distillation device starts to collect water until about 5 ml is achieved. Then, TLC is used to ensure the completion of the reaction. After the mixture is cooled to 90° C., 468 ml of aqueous solution is added slowly to the mixture and stirred for 15 minutes at the same temperature. The mixture is poured into an extraction flask and stood for a while to separate into two layers. The lower aqueous layer is removed into a waste container. 400 ml of aqueous solution are added in the extraction flask, and the mixture is stood for a while to separate into two layers. The lower aqueous layer is discarded. The organic upper layer is collected and condensed to obtain 162 g products.

28.8 g of the above-mentioned product, 8.8 g of methacrylic acid, 0.98 g of PTSA and 200 ml of toluene are added in a 1-L four-necked flask equipped with a thermometer and a distillation device for dehydration. After the mixture in the flask is stirred and heated to 112° C. on a hot-plate stirrer, the distillation device starts to collect water until about 0.8 ml is achieved. Then, TLC is used to ensure the completion of the reaction. After the mixture is cooled to 90° C., 200 ml of 1N NaHCO$_3$ aqueous solution is added slowly to the mixture and stirred for 15 minutes at the same temperature. The mixture is poured into an extraction flask and is stood for a while to separate into two layers. The lower aqueous layer is removed into a waste container. 200 ml of 1N NaHCO$_3$ aqueous solution is added in the extraction flask, and the mixture is stood for a while to separate into two layers. The lower aqueous layer is discarded. The organic upper layer is collected and condensed to obtain 18 g crude extract (I)-e.

Purification of the Compound (I)-e 225 g (about 15-fold amounts of sample) of column packing gel (Waters corporation, preparative C18 125 Å) and 225 ml of methanol are evenly mixed, and then poured slowly into a column (Pyrex company, 25G3) for packing. After the packing of the column achieves compactness, deionized water the same as the amount of methanol is used to substitute methanol, and then substituted by 1 L of an eluent (methanol:water=9:1). About 17 g of the crude extract (I)-e is slowly poured into the column and eluted by about 1 L of the eluent (methanol:water=1:1), and every 200 mL of eluate is collected as one fraction. The crude extract (I)-e is continuously eluted and then 100 mL of eluate is collected as one fraction. Once the collected eluate amounts to about 2 L, the pure target compound appears, and is continuously analyzed by reverse phase TLC (Merck company, RP-18 $F_{254}S$) to check when to stop elution. After HPLC analysis is completed, the target compound is condensed to meet the specification and then obtained a brown-oil product.

Compound (I)-e Spectrum $^1$H NMR (CDCl$_3$):

δ: 11.81 (s, 1H), 8.14 (s, 1H), 7.92 (q, 2H), 7.47 (q, 2H), 7.20 (s, 1H), 6.11 (s, 1H), 5.56 (s, 1H), 4.26 (m, 4H), 3.63 (m, 12H), 3.00 (t, 2H), 2.74 (t, 2H), 1.93 (s, 3H), 1.50 (s, 9H).

Example 6

Solubility Test

In an alcohol-water system containing 40% isopropanol (IPA) and 60% water, commercial benzotriazole A (benzenepropanoic acid, 3-(2H-benzotriazol-2-yl)-5-(1,1-dimethylethyl)-4-hydroxy-2-(2-methyl-1-oxo-2-propenyl)oxy) ethyl ester), and the compounds (I)-a, (I)-b, (I)-c, (I)-d and (I)-e are tested for their solubility.

Method of the Solubility Test

The solubility test is performed in 40% IPA aqueous solution. The equipment is listed as follows: Waters 717 autosampler, Waters 996 photodiode array detector (PDA), and Waters 600 pump. The amount of injection is adjusted into 20 µl. The analysis column is Phenomenex Luna C18. The flow rate of mobile phase (acetonitrile) is 1 ml/min. A calibration curve (linear regression≧0.999) is created by accurately weighting suitable amount of the sample in 40% IPA aqueous solution, then sequentially diluting the sample solution and analyzing the sample solutions with HPLC, and plotting a diagram of peak area vs. concentration. Then, the solubility of the samples dissolving in 40% IPA aqueous solution is determined by preparing a saturated solution of the sample in 40% IPA aqueous solution at room temperature, diluting the saturated solution until a peak area thereof analyzed by HPLC is in the range of the calibration curve, and calculating the real concentration of the sample based on the calibration curve. The results are shown in FIG. 1.

With reference to FIG. 1, the results show that the solubility of the compounds (I)-a, (I)-b, (I)-c, (I)-d and (I)-e is superior to that of the commercial Benzotriazole A in an alcohol-water system containing 40% isopropanol (IPA) and 60% water.

Example 7

Application Test

Materials of formulations used in the test are listed as the following Table 2, and the unit thereof is % wt.

TABLE 2

| Formulation | HEMA | EGDMA | I907 | TPO | RUVA |
|---|---|---|---|---|---|
| 1 | 97.3 | 1.98 | 0.33 | 0.17 | |
| 2 | 97.3 | 1.98 | 0.33 | 0.17 | 0.5 |

Figure 2:
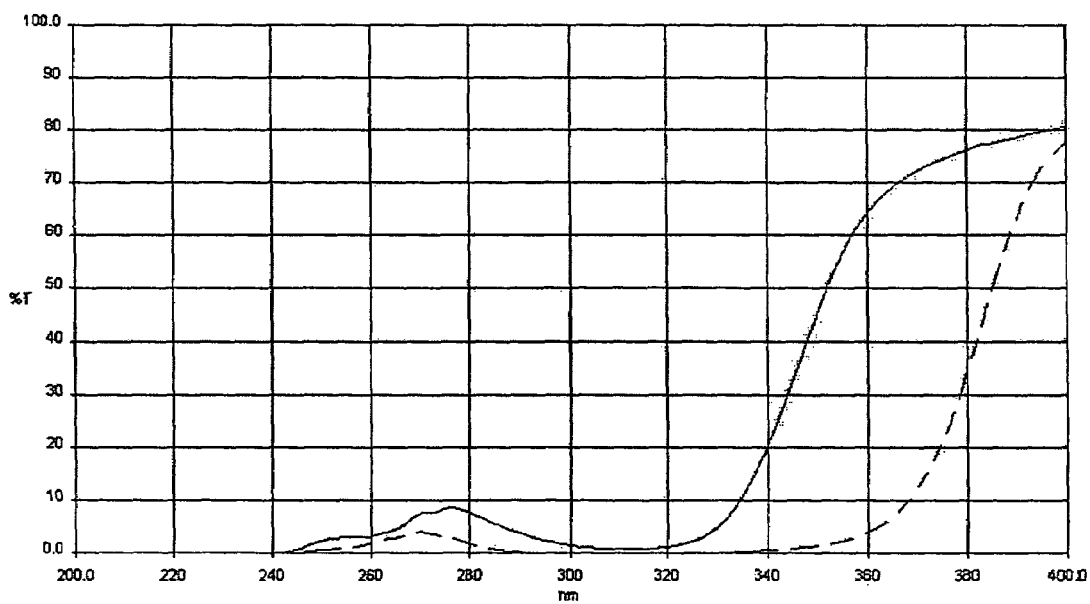
FIG. 2 is a UV-transmission spectrum for comparing Formulation 2 containing the compound (I)-e with Formulation 1 containing no compound of the present invention in Example 7.

HEMA: 2-hydroxyethyl methacrylate
EGDMA: ethylene glycol dimethacrylate
I907: Irgacure 907 purchased from Ciba company
TPO: Darocur TPO purchased from Ciba company
RUVA: compound (I)-e The composition of each formulation listed in Table 2 is used to form a film of hydrogel. The thickness of the film is about from 0.18 mm to 0.20 mm. UV spectrophotometer is used to determine transmission spectrum of each film. The result of UV spectrum is shown in FIG. 2. The solid line (—) represents Formulation 1, and the dotted line (- - -) represents Formulation 2. With reference to UV spectrum, the result of the application test shows that contact lenses made by the novel monomer of the polymerizable water-soluble or alcohol-soluble ultraviolet absorber in the present invention can possess excellent UV protection.

In conclusion, the present invention can indeed meet the requirement of patentability such as novelty, unobviousness and industrial application, and can also achieve the purpose of the invention by the disclosed technique concept. Although the present invention has been explained in relation to its preferred embodiment, it is to be understood that many other possible modifications and variations can be made without departing from the scope of the invention as hereinafter claimed.

What is claimed is:

1. A monomer of a polymerizable water-soluble or alcohol-soluble ultraviolet absorber, which is represented by the following formula (I):

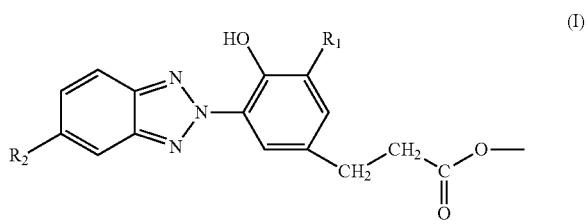

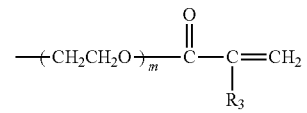

wherein $R_1$ is H or $C_{1\sim 5}$ alkyl; $R_2$ is H, Cl, Br or I; $R_3$ is H or methyl; and m is an integer in the range from 3 to 12.

2. The monomer as claimed in claim 1, wherein the formula (I) is a compound of following formula (Ia):

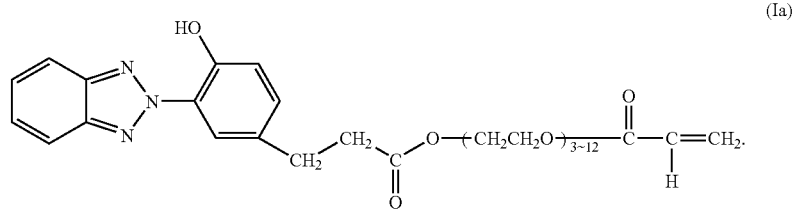

3. The monomer as claimed in claim 1, wherein the formula (I) is a compound of following formula (Ib):

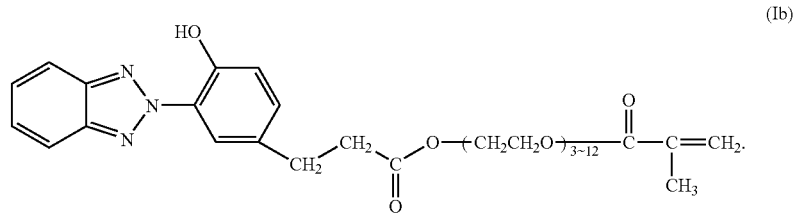

4. The monomer as claimed in claim 1, wherein the formula (I) is a compound of following formula (Ic):

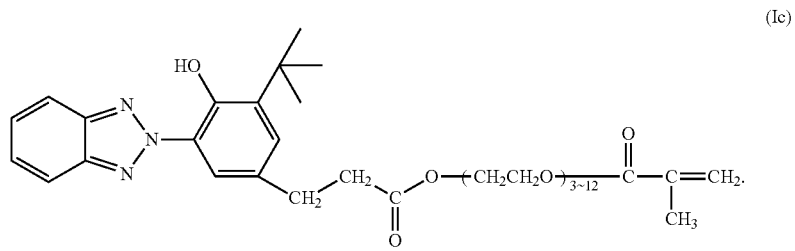
(Ic)

5. A polymer capable of absorbing ultraviolet radiation, comprising:
   a polymerizable monomer represented by the following formula (I):

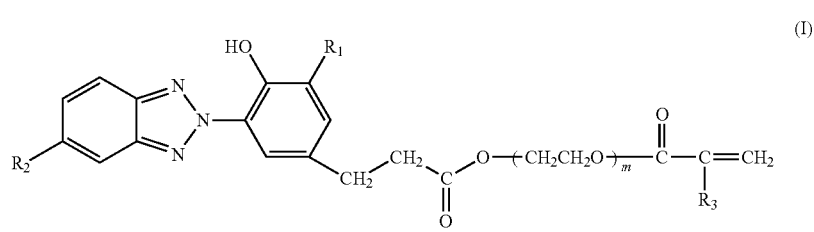
(I)

wherein $R_1$ is H or $C_{1-5}$ alkyl; $R_2$ is H, Cl, Br or I; $R_3$ is H or methyl; and m is an integer in the range from 3 to 12; and
at least one polymerizable comonomer.

6. A method for preparing a monomer of a polymerizable water-soluble or alcohol-soluble ultraviolet absorber, comprising:
   reacting a compound represented by the following formula (II) with polyethylene glycol (PEG) represented by the following formula (III) to obtain a compound represented by the following formula (IV), and reacting the compound of the formula (IV) with an acrylate represented by the following formula (V) to obtain a compound represented by the following formula (I),

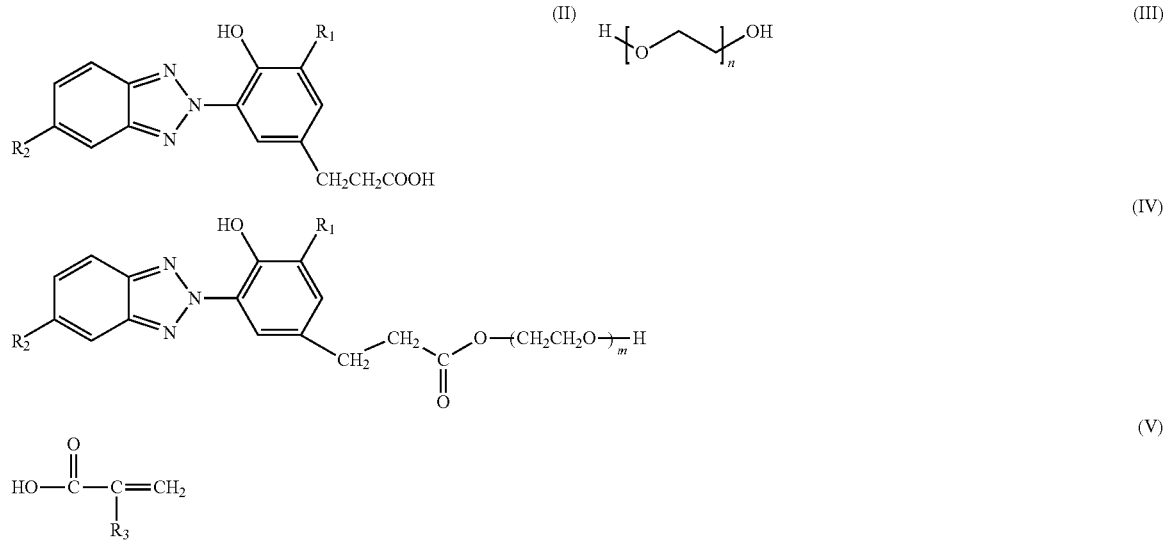

-continued

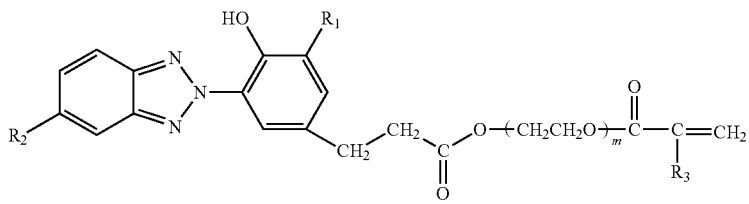
(I)

wherein $R_1$ is H or $C_{1\sim5}$ alkyl; $R_2$ is H, Cl, Br or I; $R_3$ is H or methyl; and m and x are each an integer in the range from 3 to 12.

7. A method for preparing a monomer of a polymerizable water-soluble or alcohol-soluble ultraviolet absorber, comprising:
reacting a compound represented by the following formula (II) with a compound represented by the following formula (VI) to obtain a compound represented by the following formula (I),

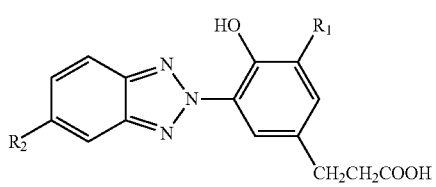
(II)

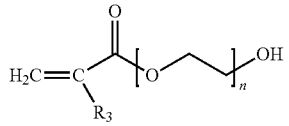
(VI)

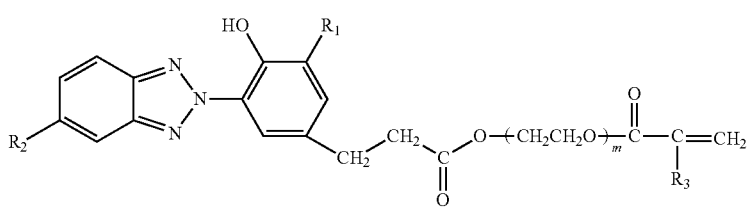
(I)

wherein $R_1$ is H or $C_{1\sim5}$ alkyl; $R_2$ is H, Cl, Br or I; $R_3$ is H or methyl; and m and n are each an integer in the range from 3 to 12.

8. An anti-UV contact lens, which is prepared by dissolving the monomer as claimed in claim 1 in a hydrophilic material.

9. The anti-UV contact lens as claimed in claim 8, wherein the hydrophilic material comprises hydrogel or silicone hydrogel.

10. An anti-UV intraocular lens, which is prepared by dissolving the monomer as claimed in claim 1 in a hydrophilic material.

11. The anti-UV intraocular lens as claimed in claim 10, wherein the hydrophilic material comprises hydrogel or silicone hydrogel.

* * * * *